US009283890B1

(12) United States Patent
Huebner et al.

(10) Patent No.: US 9,283,890 B1
(45) Date of Patent: Mar. 15, 2016

(54) ARTICLE STORAGE ASSEMBLY AND VEHICLE STORAGE CONSOLE INCLUDING THE SAME

(71) Applicant: FORD GLOBAL TECHNOLOGIES, LLC, Dearborn, MI (US)

(72) Inventors: Annette Lynn Huebner, White Lake, MI (US); Kristin Ann Hellman, Walled Lake, MI (US); Scott Holmes Dunham, Redford, MI (US); Bernard Gerard Marchetti, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 30 days.

(21) Appl. No.: 14/488,386

(22) Filed: Sep. 17, 2014

(51) Int. Cl.
*B60Q 3/02* (2006.01)
*F21K 99/00* (2010.01)
*B60R 7/04* (2006.01)
*B60R 11/00* (2006.01)
*F21Y 101/02* (2006.01)
*F21W 101/08* (2006.01)

(52) U.S. Cl.
CPC . *B60Q 3/022* (2013.01); *B60R 7/04* (2013.01); *B60R 11/00* (2013.01); *F21K 9/56* (2013.01); *B60R 2011/0007* (2013.01); *B60R 2011/0045* (2013.01); *F21W 2101/08* (2013.01); *F21Y 2101/02* (2013.01)

(58) Field of Classification Search
CPC .......... B60Q 3/022; B60R 7/04; B60R 11/00; B60R 2011/0007; B60R 2011/0045
USPC ............................................. 362/154, 155, 488
See application file for complete search history.

(56) References Cited

U.S. PATENT DOCUMENTS

| 5,121,306 | A | * | 6/1992 | Palmisano | ............... B60R 9/00 224/404 |
|---|---|---|---|---|---|
| 5,158,353 | A | | 10/1992 | Kimisawa | |
| 6,637,632 | B2 | | 10/2003 | Chiku | |
| 7,328,825 | B2 | | 2/2008 | Kaiser | |
| 8,235,567 | B2 | * | 8/2012 | Hipshier | .................. B60R 7/04 362/154 |
| 2004/0262352 | A1 | | 12/2004 | Sturt | |
| 2009/0175049 | A1 | * | 7/2009 | Lota | ....................... B60N 3/101 362/488 |

FOREIGN PATENT DOCUMENTS

| JP | 10045192 A | 2/1998 |
|---|---|---|
| JP | H11301354 A | 11/1999 |
| JP | 2000052878 A | 2/2000 |
| JP | 2002036962 A | 2/2002 |
| JP | 2009056861 A | 3/2009 |
| WO | 2008116990 A2 | 10/2008 |

* cited by examiner

*Primary Examiner* — Laura Tso
(74) *Attorney, Agent, or Firm* — Vichit Chea; Law Firm of Dr. Jungqi Hang, PLC (57) ABSTRACT

An article storage assembly of a vehicle includes a storage pocket with an illumination colorant, and an attachment unit for detachably connecting the storage pocket to an interior part of the vehicle such that the storage pocket is connected to the interior part in a first position and is separate from the interior part in a second position.

20 Claims, 5 Drawing Sheets

ARTICLE STORAGE ASSEMBLY AND VEHICLE STORAGE CONSOLE INCLUDING THE SAME

TECHNICAL FIELD

The disclosed invention relates generally to an article storage assembly and a vehicle storage console including the same.

BACKGROUND

In present days, motorists and their passengers often find it desirable to have handy a variety of documents such as credit cards, bank cards, employee badges, parking tickets, cash currency, sticky notes and store coupons. Most vehicles provide onboard a variety of storage compartments such as storage bins and consoles. However, these compartments tend to be relatively too general in storage purpose and too deep in storage size such that a user often needs to take time investigating the whereabouts of a particular item before being able to successfully retrieve it from a pile. The search often becomes even more difficult when the item to be retrieved is of relatively small size such as the cards and documents mentioned herein above.

U.S. Pat. No. 6,637,632 B2 discloses a card holding structure and vehicle console box including the same, wherein the card holding structure is disclosed to include a base plate, a holding member and a step-like member.

SUMMARY

In one or more embodiments, the present invention provides an article storage assembly for a vehicle, including a storage pocket with an illumination colorant, and an attachment unit for detachably connecting the storage pocket to an interior part of the vehicle such that the storage pocket is connected to the interior part in a first position and is separate from the interior part in a second position.

In another or more embodiments, the present invention provides a storage console of a vehicle, including a housing, and a storage pocket having an illumination colorant and being detachably supported on the housing.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

As referenced in the FIGS. 1 to 8B, the same reference numerals are used to refer to the same components. In the following description, various operating parameters and components are described for different constructed embodiments. These specific parameters and components are included as examples and are not meant to be limiting.

The present invention in one or more embodiments is advantageous in providing illuminated, detachable storage pockets for storing articles such as relatively thin articles including credit cards, gift cards, cash currency, sticky notes, parking tickets and business cards. The storage pockets thus provided may be quickly located via colorant-mediated illumination upon activation with energy available from a vehicle environment and be removed with complete detachment from the vehicle environment as needed. Once detached, the entire storage pocket may function as a carry-on item to accompany the user in any subsequent trips. In addition, and to provide enhanced operational ease, the storage pocket may be designed as rotatable in several different directions, such as axially rotatable, pivotally twistable, or circularly fan-outable. Furthermore, the illumination colorant may be in communication with any suitable light emitting diodes (LED) that are optionally energized and activated via energies available from the vehicle environment.

Figure 1:
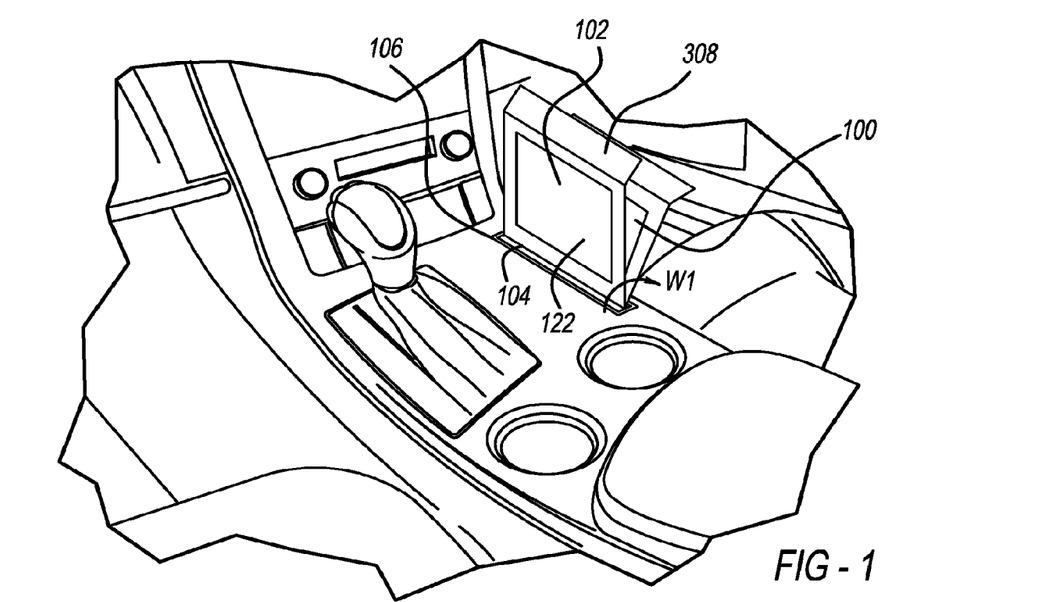
FIG. 1 illustratively depicts a perspective view of an article storage assembly for use in a vehicle according to one or more embodiments.
Figure 2:
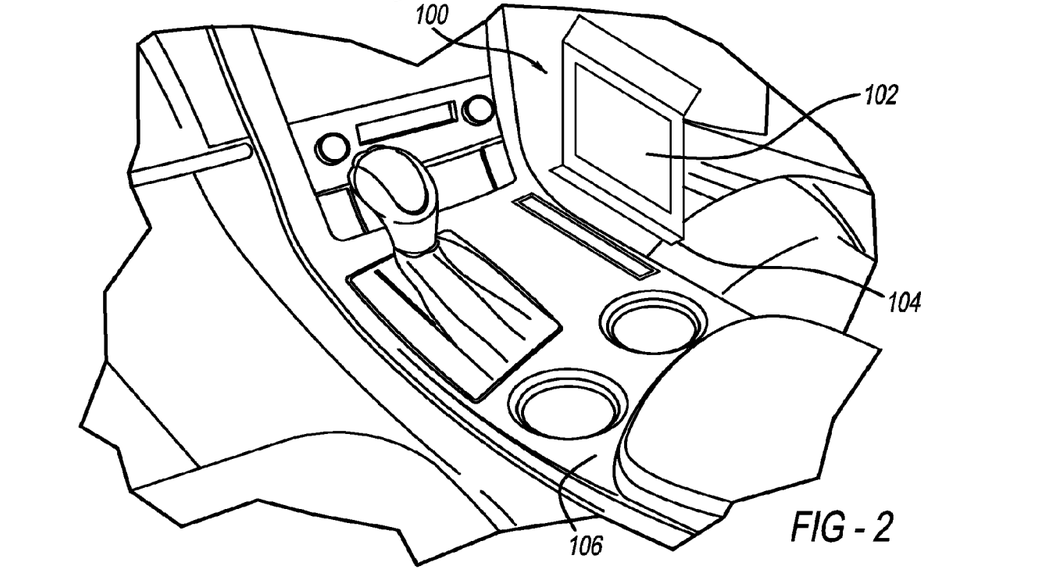
FIG. 2 illustratively depicts another view of the article storage assembly referenced in FIG. 1.

In one or more embodiments, and as illustratively depicted in FIG. 1 and FIG. 2, an article storage assembly generally shown at 100 includes a storage pocket 102 with an illumination colorant 122, and an attachment unit 104 for detachably connecting the storage pocket 102 to an interior part 106 of a vehicle (not shown). In this design, the storage pocket 102 is connected to the interior part 106 in a first position as illustratively depicted in FIG. 1, and is separate and detached from the interior part in a second position as illustratively depicted in FIG. 2.

The vehicle as mentioned herein may be any residential, commercial, governmental or military vehicles, and may be of any make, style or shape.

Although the interior part 106 of the vehicle is illustratively depicted in FIG. 1 and FIG. 2 as a location or space near a central console of the vehicle, the specific location for the interior part 106 of the vehicle as mentioned herein does not have to be limited, and in fact may be of any interior location or space available from within the vehicle. Other non-limiting examples of these suitable locations for the interior part 106 include the instrument panel, the door compartments, the seatback pockets, the backseat console, the trunk area, and any other suitable interior trims.

Referring back to FIG. 1, the storage pocket 102 is shown connected to the interior part 106 via the attachment unit 104. As is detailed herein elsewhere in relation to FIG. 3, the storage pocket 102 may rotate about the attachment unit 104 along direction "W1" to provide enhanced ease for access and retrieval.

Figures 3A, 3B:
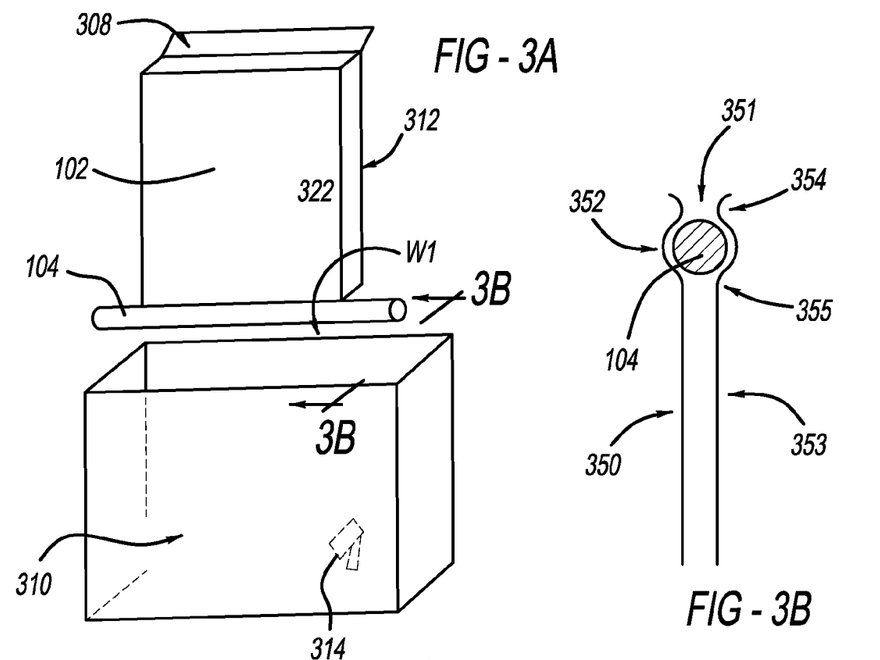
FIG. 3A illustratively depicts an enlarged, partial view of the article storage assembly referenced in FIG. 1 or FIG. 2.
FIG. 3B illustratively depicts a cross-sectional view of an interior part of the vehicle to receive the article storage assembly referenced in FIG. 3A.
Figure 4:
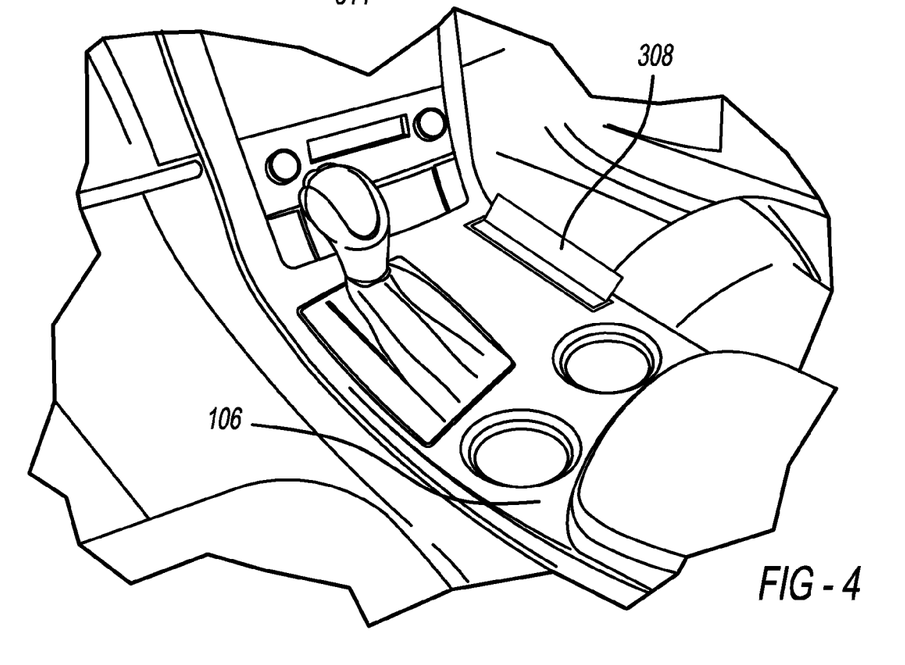
FIG. 4 illustratively depicts yet another view of the article storage assembly referenced in FIG. 1 or FIG. 2.

FIG. 3A illustratively depicts an enlarged perspective view of the article storage assembly 100 referenced in FIG. 1 and FIG. 2. In certain embodiments, and as illustratively depicted in FIG. 3A, the attachment unit 104 is an elongated rod supporting the storage pocket 102. The storage pocket 102 may be, via the attachment unit 104, lowered into and hence at least partially received within a cavity 310 of the interior part 106. Accordingly the storage pocket 102 may be completely received within the cavity 310 when needed. FIG. 4 illustratively depicts a view of the article storage assembly 100 as fully stowed away wherein the storage pocket 102 is received within the cavity 310.

To provide additional ease in locating the storage pocket 102, the article storage assembly 100 may further include, as illustratively depicted in FIG. 3A and FIG. 4, an indicator tab 308, which optionally includes an illumination colorant same to or different from the illumination colorant included in the storage pocket 102. The indicator tab 308 may be of the same or different width dimension in relation to the storage pocket 102, and may be of any suitable shape and texture. The general direction is that the indicator tab 308 may function as a locator or as a handle to assist one in locating and grabbing the storage pocket 102, particularly when the latter is in a fully recessed position such as the one shown in FIG. 4.

Figure 5:
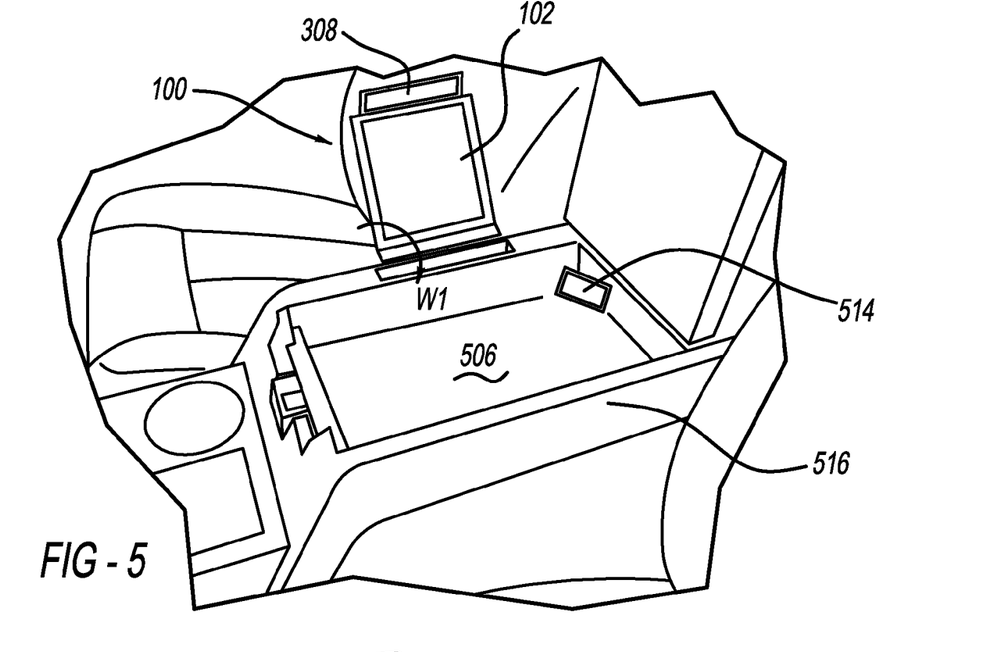
FIG. 5 illustratively depicts yet another view of the article storage assembly referenced in FIG. 1, FIG. 2 or FIG. 4.
Figure 6:
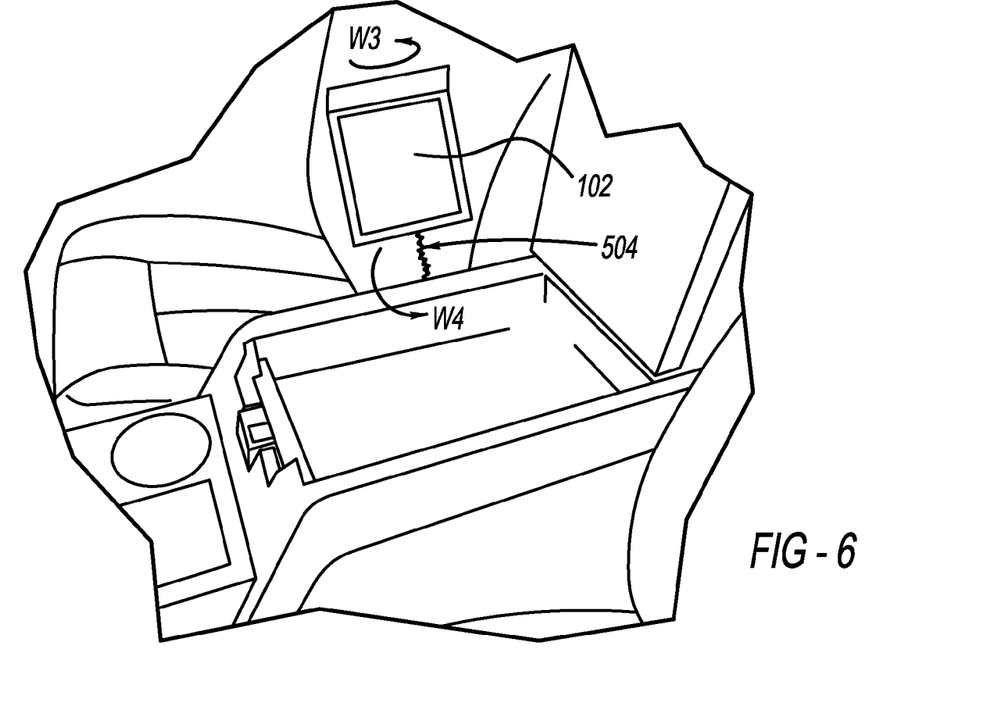
FIG. 6 illustratively depicts yet another view of the article storage assembly referenced in FIG. 1, FIG. 2, FIG. 4 or FIG. 5.

The cavity 310 may be positioned anywhere in or around the interior part 106, or any other place or location available within the vehicle as mentioned herein elsewhere. In particular, the cavity 310 may be part of a central console 506 referenced herein later in FIG. 5 and as a particular example of the interior part 106, or may be positioned external and/or next to the central console 506. FIG. 1 in view of FIG. 4 shows that the cavity to at least partially receive the storage pocket 102 may be located on a side wall of the interior part 106. FIG. 5 shows that the cavity to receive at least a portion of the storage pocket 102 may be a housing 516 of the central console 506.

Referring back to FIG. 3A, and in view of FIG. 3B which illustratively depicts a cross-sectional view of the cavity 310 referenced in FIG. 3A, a guiding tunnel generally shown at 350 is provided. The guiding tunnel 350 includes first, second and third sections indicated at 351, 352 and 353, respectively. One or more gliding tunnels 350 may be configured within the cavity 310 as needed. In operation, the attachment unit 104 along with the storage pocket 102 moves through the first section 351 and then enters the second section 352 after passing a tension neck 354. Within the second section 352, the attachment unit 104 may freely rotate along direction "W1". Downstream of the second section 352 is a second tension neck 355 which the attachment unit 104 passes through prior to its entry into the third section 353. The tension necks 354 and 355 are designed and configured such that certain force may need to be applied for the attachment unit 104 to move there-through. Thus this provides the second section 352 as a somewhat default position for the attachment unit 104. Accordingly accidental or unintended relocation of the attachment unit 104 to and from the first section 351 or to and from the third section 353 may be effectively avoided.

When a passenger or driver desires to take the documents or cards with him/her, he/she may pull and detach the article storage assembly 100 from the interior part 106 of the vehicle. With the continued pulling, the attachment unit 104 may reach and rest in the second section 352, at which the storage pocket 102 may rotate about the direction "W1" as mentioned herein elsewhere.

To further facilitate the storing and retrieval of the storage pocket 102 into and out from the cavity 310, the storage pocket 102 may further be configured as semi-rigid. For instance, the storage pocket 102 may include a back 312 and a cover 322, wherein the back 312 is sturdy enough to sustain the force needed to drive down or up the attachment unit 104 into and out from the cavity 310. The back 312 may be of any suitable sizes and dimensions relative to the cover 322. In certain embodiments, the back 312 may just be a rib-like elongated structure to help the storage pocket 102 stay upright and be rigid enough for the pulling and pushing actions exerted thereupon. In addition, the back 312 may be formed of a rigid material such as a hard plastic, a metal or glass; and the cover 322 may be formed of a relatively softer material such as soft plastic, leather, paper or anything suitable for the purpose. In addition, the cover 322 may be made see-through or clear to assist with locating a particular item in the storage pocket 102.

In the event that the storage pocket 102 does include a relatively hard back like the back 312 and a relatively soft cover like the cover 322, majority if not all of the illumination colorant may be included in the relatively soft cover. This may be more practical when the illumination colorant needs to be co-molded into forming the storage pocket 102.

Although only one storage pocket 102 is shown attachable to the attachment unit 104, more storage pockets 102 may be concurrently attached to the attachment unit 104 either alongside to one and another, or arranged in a fan-out configuration, dependent upon the particular space available from the cavity 310.

In certain other embodiments, and as illustratively depicted in FIG. 5, the storage pocket 102 may be recessed into a housing 516 of the central console 506, which is a particular example of the interior part 106 mentioned herein elsewhere. In this design, LED lights 514 may be positioned also within the housing 506 to energize the illumination colorant in the storage pocket 102.

As described herein, a feature of the storage pocket 102 common to FIG. 1 through FIG. 6 is the illumination colorant included in the storage pocket 102. The illumination colorant may include one or more illumination dyes, one or more illumination pigments, or both. The term "illumination" refers to a quality of the colorant being able to emit lights of certain wave lengths when excited or have been previously excited by an energy source, which include one or more LED lights. The illumination may be based on fluorescence and/or phosphorescence, referring further to emission of light by a substance upon excitation with energy such as light or electrical energy.

Without wanting to be limited to any particular theory, it is believed that the light emitted from the energy source such as the LED lights excites or activates the illumination colorant to give away illumination, and in particular visible light. Due to the need for an energy source such as the LED lights, which themselves need to be powered by, for instance, a battery or an electrical circuit connection, the vehicle provides a readily available source for the electrical power, the LED lights, and hence the possibility of generating the colored illumination from the storage pocket 102. In other words, the article storage assembly 100 works synergistically with a vehicle environment where the former draws operating energy from the latter and the latter is enhanced in functionality when coupled with the former.

In addition, the illumination colorant may be designed and/or configured to give out illumination in a time-delayed fashion such that the illumination result from the illumination colorant occurs even after the source of excitation energy has been removed from the illumination colorant. This is particularly useful and advantageous, as detailed herein elsewhere, for the storage pocket to be locatable even after the vehicle has been turned off and hence the excitation energy for the illumination colorant on the storage pocket has thus been removed.

The excitation energy source such as the LED light may stay on for a length of time needed to charge the illumination colorant contained either in or on the storage pockets. The excitation energy source may be turned off periodically once the illumination colorant is fully charged; however once the excitation energy source is turned off, the illumination given off by the illumination colorant may show reduction in intensity. Therefore, it may be desirable under certain circumstances to keep the excitation energy source on the entire time. If some decay of illumination or reduction of illumination intensity is acceptable, then the excitation energy source may be periodically switched on and off as long as the vehicle is running. The timing by which the excitation energy source is turned on and off may be determined by the illumination intensity of the illumination colorant as desirable.

It might be possible that the illumination colorant continues to give off illumination when the energy source is turned off or disconnected from the illumination colorant, such as what occurs when certain materials give off illumination in a time-delayed fashion as detailed herein elsewhere. A practical use of the article storage assembly 100 as described herein according to one or more embodiments is that the user, upon turning on the engine of the vehicle, may quickly locate the storage pocket 102 via the illumination given off therefrom. This makes locating the storage pocket 102 and hence the contents therein almost effortlessly as the illumination may be automatically coupled with the excitation energy source such as the LED lights, which are then in line coupled with a power source readily available upon an ignition event. This method of storing certain items such as parking tickets and entry access cards particularly useful as these items usually need to stay in the vehicle although conventionally, they are easily misplaced. Now with the article storage assembly 100, locating and using these items are made less burdensome and more practical. An add-on benefit, as mentioned herein elsewhere, is the storage pocket 102 itself, or optionally along with the attachment unit 104, may be readily detached from the vehicle all together and be used as a carry-on item.

The illumination colorant as mentioned herein refers to a material that may exhibit relatively intense light absorption, and may include one or more dyes and/or pigments as suitable. The illumination colorant may work to emit light in a suitable wavelength, and particularly in the visible range of 400 to 700 nanometers. In particular, and when a time-delayed illumination as detailed herein elsewhere is desirable, the illuminant colorant may include phosphors along with dyes. Without wanting to be limited to any particular theory, it is believed that the phosphors act in a process called phosphorescence where light energy is absorbed by the phosphors and is released relatively slowly in the form of light even after the removal of the excitation source.

The use of phosphorescent materials in or as the illumination colorant is advantageous at least because phosphorescent materials readily store light when the light is available, and is capable of subsequently emitting light at a time when the excitation source is removed. Additionally, phosphorescent materials can be recharged when exposed to light or other electromagnetic wave. Without wanting to be limited to any particular theory, it is further believed that phosphorescent materials store and re-emit light because of their unusual property of trapping electrons in a higher state of movement. As light comes in contact with the material, light photons are transferred to the material and give some of their energy to the electrons within it, causing the electrons to move to a higher energy state around their nucleus. Phosphorescent materials trap their electrons in a higher energy state for minutes or even hours. Phosphorescent materials may also be relatively inexpensive and may be applied in the form of a powder, gel, liquid, and/or gas. In certain particular instances, the illumination colorant may include zinc sulfide and/or strontium aluminate as the phosphorescent material.

Phosphorescent material as detailed herein elsewhere may be a good component to the illumination colorant when time-delayed illumination is desirable. However, the illumination colorant does not necessarily have to include a phosphorescent material and may include any other illumination material that emits light. In addition, the illumination colorant may be natural, synthetic or both. Other than or in addition to the phosphorescent material, the illumination colorant may include a dye material that is based on perylene framework. In certain particular embodiments, the illumination colorant includes one or more of perylene maroon, perylene violet, perylene black and perylene red. In certain other particular embodiments, the illumination colorant includes rylene dye, which may also be referred as poly (peri-naphthalene) or "PPN."

Referring back to FIG. 3A and FIG. 5 where the LED lights 314 and 514 are shown to be positioned, the illumination colorant in the storage pocket 102 may be activated by the LED lights intermittently. Such programmed excitation is believed to provide an energy efficient way of activating the illumination colorant such as rylene dye enough to allow storage pocket 102 to glow or stay glowing for a period in the dark.

As described herein elsewhere, the attachment unit 104 is shown as an elongated rod supporting the storage pocket 102 along its longitudinal axis. The shape and the orientation of the attachment unit 104 may be varied as necessary to carry out its function of supporting the storage pocket 102 and enabling the latter's movement and rotation. For instance, and as illustratively depicted in FIG. 6, the storage pocket 102 may be supported on an attachment unit 504 via an end thereof such that the storage pocket 102 may rotate along direction "W3" and may move along direction "W4" by moving along with the attachment unit 504. In certain particular embodiments, movement flexibility of the storage pocket 102 may further be enhanced by making the attachment unit 504 flexible, foldable, retractable or bendable along its longitudinal axis.

Referring back to FIG. 6, when not in use, the storage pocket 102 may be stowed away into a housing such as the housing 506 by folding, retracting, or bending the attachment unit 504. In this configuration, the attachment unit 504 essentially functions as a key chain to secure a location for the storage pocket 102 while maintaining a reasonable level of flexibility in where the storage pocket 102 may be temporarily positioned.

The storage pocket 102 itself is not necessarily limited to any size, shape, or material. The storage pocket 102 may include or be formed of natural materials such as paper, leather or cotton, or synthetic materials such as polymers and plastics. A practical consideration as with any other pockets is the storage pocket 102 may be made transparent, for instance, via the use of certain papers or polymeric plastics. Another practical consideration as with any other pockets is the storage pocket 102 may further include its own compartments or sub-pockets 722 so as to accommodate various articles. The sub-pockets 722 may be positioned alongside to each other or may be provided with a fan-out configuration. The storage pocket 102 may itself include a zipper, buttons or adhesive strips to temporally close up the pocket when in travel.

The illumination colorant may be included in the storage pocket 102 via any suitable methods. For instance, the illumination colorant may be applied to the storage pocket 102 after the latter has been pre-formed, or may be mixed with the raw material for forming the storage pocket 102. In particular, the illumination colorant may be coupled to a polymer via chemical bonds and thereafter the illumination colorant-bound polymer is processed to form the storage pocket 102.

Figure 7A:
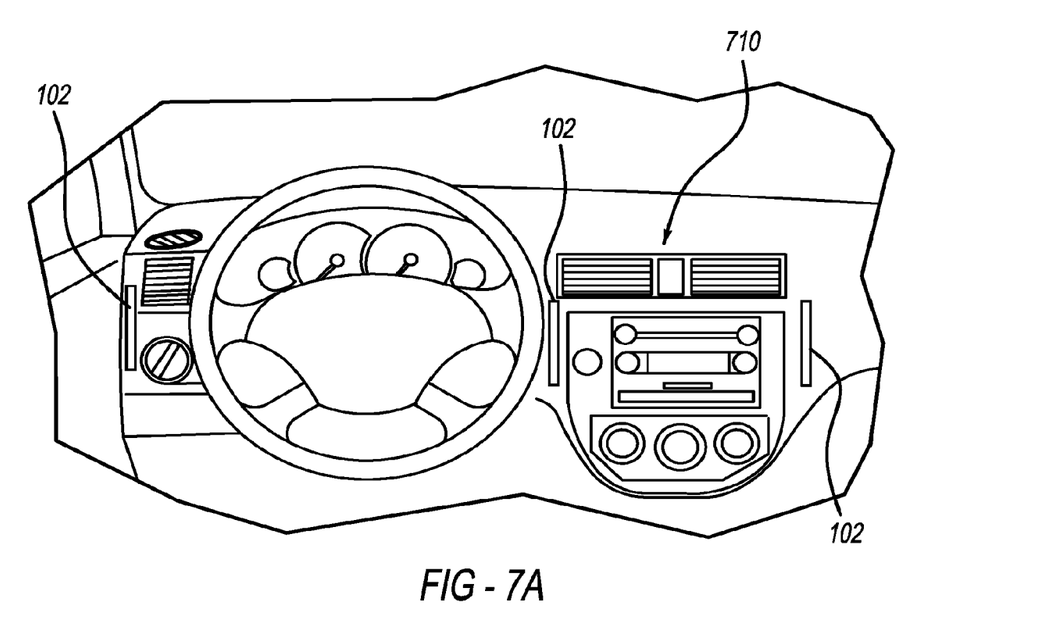
FIG. 7A illustratively depicts yet another view of the article storage assembly referenced in FIG. 1, FIG. 2, FIG. 4, FIG. 5, or FIG. 6.

In one or more embodiments, and as illustratively depicted in FIG. 7A, one or more storage pockets 102 may be incorporated into or installed onto an instrument panel 710. At a closed position, each of the storage pockets 102 may be fully retracted into and received within an interior of the instrument panel 710. The storage pockets 102 may be detached from the instrument panel 710 and a perspective view of the storage pocket 102 as detached from the instrument panel 710 is illustratively depicted in FIG. 7B.

Figure 7B:
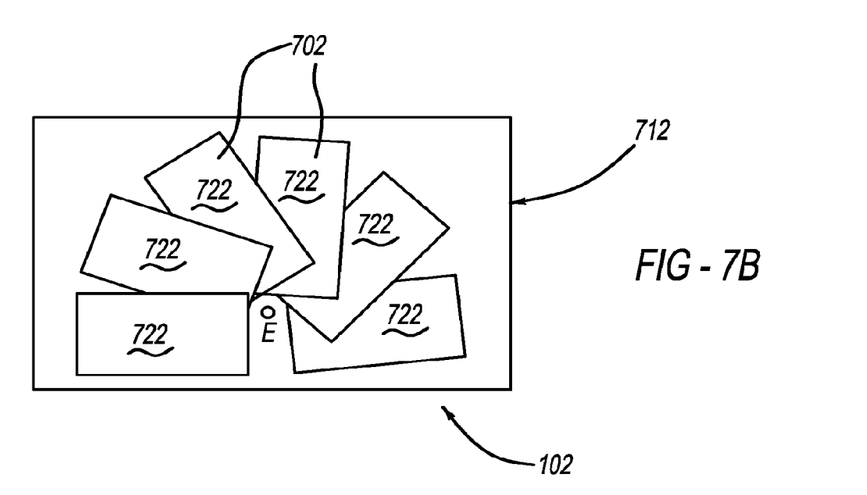
FIG. 7B illustratively depicts a perspective view of the article storage assembly referenced in FIG. 7A.

Referring to FIG. 7B, the storage pocket 102 may include a back 712 similar to the back 312 mentioned herein elsewhere. Items 702 to be stored, such as credit cards or gift cards, may be arranged onto the back 712 via for instance common point "E" for fan-out like pivoting connection. Optionally, the storage pocket 102 may further include a cover (not shown) which works along with the back 712 to provide an enclosure for the items 702. Optionally also, the back 712 and/or the back 712 along with its cover may be sectioned to form individual pockets for the items 702.

Figure 8A:
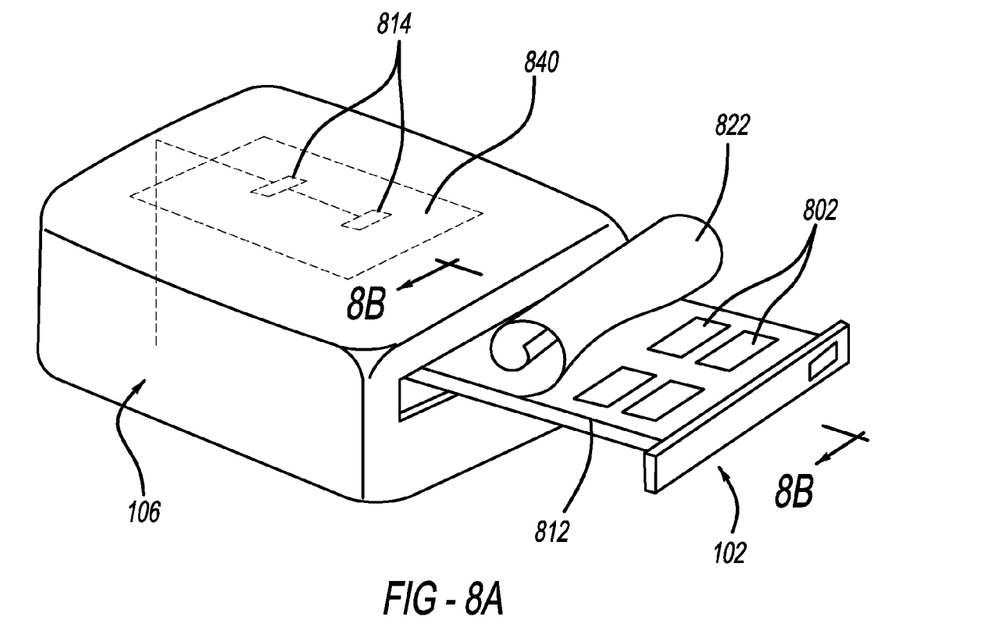
FIG. 8A illustratively depicts yet another view of the article storage assembly referenced in FIG. 1, FIG. 2, FIG. 4, FIG. 5, FIG. 6, or FIG. 7A.

In one or more embodiments, and as illustratively depicted in FIG. 8A, the storage pocket 102 may be provided as movable into and out from the interior part 106 such as a console armrest. As provided, the storage pocket 102 includes a back 812 and a cover similar to the back 312 and the cover 322 respectively mentioned herein elsewhere. Items 802 such as credit cards, shopping cards and parking tickets may be laid flat between the cover 822 and the back 812.

Figure 8B:
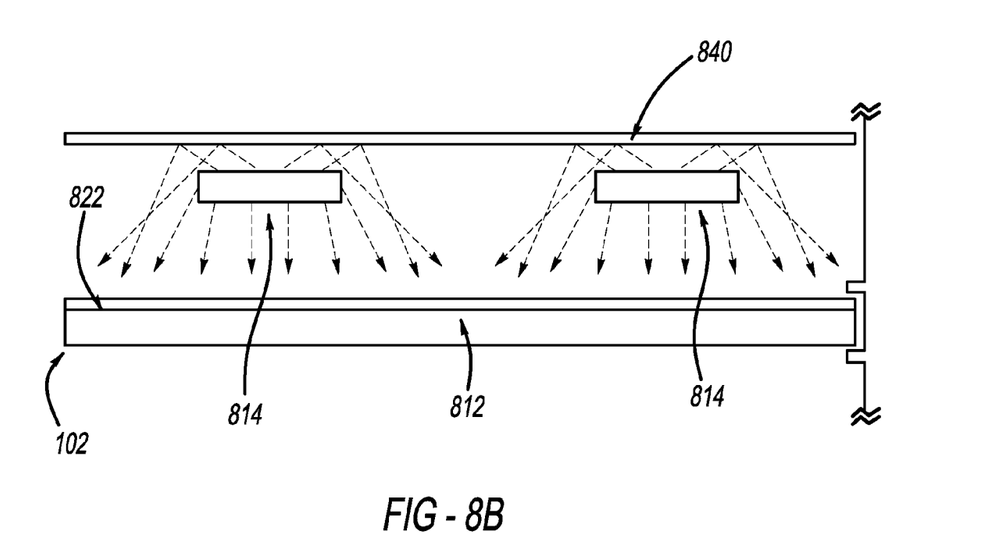
FIG. 8B illustratively depicts a cross-sectional view of the article storage assembly referenced in FIG. 8B.

Referring back to FIG. 8A and further in view of FIG. 8B, illumination device 814 such as LED lights may be employed inside of the interior part 106 such as the console armrest. When parts of the storage pocket 102, such as the cover 822 thereof, are configured to include one or more illumination colorant as mentioned herein elsewhere, the illumination device 814 may work to activate the illumination colorant which then gives off illumination in dark whenever as desirable. A reflector 840 is optionally employed to enhance concentration of energy from the illumination device 840 to the storage pocket 102.

In one or more embodiments, the disclosed invention as set forth herein provides an advantageous article and method for storing and locating certain items in association with a vehicular environment. One skilled in the art will readily recognize from such discussion, and from the accompanying drawings and claims that various changes, modifications and variations can be made therein without departing from the true spirit and fair scope of the invention as defined by the following claims.

What is claimed is:

1. An article storage assembly of a vehicle, comprising:
    a storage pocket including an illumination colorant which includes a phosphorescent material; and
    an attachment unit for detachably connecting the storage pocket to an interior part of the vehicle such that the storage pocket is connected to the interior part at a first position and is separate from the interior part at a second position.

2. The article storage assembly of claim 1, wherein the illumination colorant includes a rylene dye.

3. The article storage assembly of claim 1, further comprising a light emitting diode (LED) in communication with the illumination colorant.

4. The article storage assembly of claim 1, wherein the interior part of the vehicle includes a cavity such that the storage pocket is at least partially receivable within the cavity at a third position.

5. The article storage assembly of claim 1, wherein the storage pocket is rotatable about two different axes of the attachment unit.

6. The article storage assembly of claim 1, wherein the storage pocket includes a number of compartments.

7. The article storage assembly of claim 1, wherein the storage pocket includes a base and cover, and the cover includes the illumination colorant.

8. The article storage assembly of claim 4, wherein the storage pocket further includes an indicator tab, the indictor tab including the illumination colorant and being at least partially external to the cavity at the third position.

9. A storage console of a vehicle, comprising:
    a housing;
    a storage pocket including an illumination colorant and being detachably supported on the housing; and
    an attachment unit positioned between the storage pocket and the housing, wherein the storage pocket is rotatable about two different axes of the attachment unit.

10. The storage console of claim 9, wherein the housing further includes a cavity to at least partially receive the storage pocket.

11. The storage console of claim 10, wherein the storage pocket is connected to the attachment unit along a longitudinal axis of the attachment unit.

12. The storage console of claim 10, wherein the illumination colorant includes at least one of a phosphorescent material and a rylene dye.

13. The storage console of claim 10, further comprising a light emitting diode (LED) in communication with the illumination colorant.

14. An article storage assembly of a vehicle, comprising:
    a storage pocket including an illumination colorant; and
    an attachment unit for detachably connecting the storage pocket to an interior part of the vehicle such that the storage pocket is connected to the interior part at a first position and is separate from the interior part at a second position, wherein the storage pocket is rotatable about two different axes of the attachment unit.

15. The article storage assembly of claim 14, wherein the illumination colorant includes a rylene dye.

16. The article storage assembly of claim 14, further comprising a light emitting diode (LED) in communication with the illumination colorant.

17. The article storage assembly of claim 14, wherein the interior part of the vehicle includes a cavity such that the storage pocket is at least partially receivable within the cavity at a third position.

18. The article storage assembly of claim 14, wherein the storage pocket includes a number of compartments.

19. The article storage assembly of claim 14, wherein the storage pocket includes a base and cover, and the cover includes the illumination colorant.

20. The article storage assembly of claim 17, wherein the storage pocket further includes an indicator tab, the indictor tab including the illumination colorant and being at least partially external to the cavity at the third position.

* * * * *